United States Patent
Kobayashi et al.

(10) Patent No.: US 8,935,927 B2
(45) Date of Patent: Jan. 20, 2015

(54) MAGNETIC REFRIGERATING DEVICE AND MAGNETIC REFRIGERATING SYSTEM

(75) Inventors: Tadahiko Kobayashi, Kanagawa (JP); Akiko Saito, Kanagawa (JP); Shiori Kaji, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 961 days.

(21) Appl. No.: 13/079,451

(22) Filed: Apr. 4, 2011

(65) Prior Publication Data

US 2012/0031108 A1 Feb. 9, 2012

(30) Foreign Application Priority Data

Aug. 5, 2010 (JP) .................................. 2010-176336

(51) Int. Cl.
F25B 21/00 (2006.01)
(52) U.S. Cl.
CPC .......... *F25B 21/00* (2013.01); *F25B 2321/0022* (2013.01); *Y02B 30/66* (2013.01)
USPC ........................................................ 62/3.1
(58) Field of Classification Search
USPC .................................................. 62/3.1; 1/3.1
See application file for complete search history.

(56) References Cited

U.S. PATENT DOCUMENTS

| | | | |
|---|---|---|---|
| 2,510,800 A * | 6/1950 | Chilowsky | 310/306 |
| 4,332,135 A | 6/1982 | Barclay et al. | |
| 4,507,927 A | 4/1985 | Barclay | |
| 6,526,759 B2 | 3/2003 | Zimm et al. | |
| 6,668,560 B2 * | 12/2003 | Zimm et al. | 62/3.1 |
| 7,536,866 B2 | 5/2009 | Kobayashi et al. | |
| 2009/0217675 A1 | 9/2009 | Kobayashi et al. | |
| 2009/0308079 A1 * | 12/2009 | Lee | 62/3.1 |

FOREIGN PATENT DOCUMENTS

| | | |
|---|---|---|
| JP | 10-30855 | 2/1998 |
| JP | 2010-25435 | 2/2010 |
| SU | 1105737 | 7/1984 |
| WO | WO 2010/023381 A2 | 3/2010 |

OTHER PUBLICATIONS

Extended European Search Report issued by the European Patent Office on Mar. 20, 2013, for European Patent Application No. 11160958.2.
Kaji et al., U.S. Appl. No. 13/079,218, filed Apr. 4, 2011.
Partial European Search Report issued by the European Patent Office on Nov. 6, 2012, for European Patent Application No. 11160958.2.

* cited by examiner

*Primary Examiner* — Cassey D Bauer
(74) *Attorney, Agent, or Firm* — Finnegan, Henderson, Farabow, Garrett & Dunner, L.L.P.

(57) ABSTRACT

The magnetic refrigerating device according to one embodiment includes a fixed container filled with a refrigerant, the fixed container including a magnetic material container that is filled with a magnetic material and that can move in the fixed container and an elastic member provided at the end of the magnetic material container. The magnetic refrigerating device also includes a magnetic-field applying/removing mechanism that is provided at the outside of the fixed container, and that can apply and remove a magnetic field to and from the magnetic material and can generate a magnetic torque to the magnetic material container in moving direction of the magnetic material container.

10 Claims, 6 Drawing Sheets

MAGNETIC REFRIGERATING DEVICE AND MAGNETIC REFRIGERATING SYSTEM

CROSS-REFERENCE TO RELATED APPLICATION

This application is based upon and claims the benefit of priority from Japanese Patent Application No. 2010-176336, filed on Aug. 5, 2010, the entire contents of which are incorporated herein by reference.

FIELD

Embodiments described herein relate generally to a magnetic refrigerating device and a magnetic refrigerating system.

BACKGROUND

As one of environment-conscious and highly-efficient refrigerating technique, expectations for a magnetic refrigeration have been increased, leading to increasingly active research and development for magnetic refrigerating techniques designed for a room temperature range.

As one of the magnetic refrigerating techniques, there has been proposed an AMR (Active Magnetic Refrigeration) system in which a lattice entropy, which used to be positioned as an obstructive factor for the magnetic refrigeration in a room temperature range, is positively utilized in order to allow a magnetic material to bear a thermal storage effect for storing cold heat generated by the magnetic refrigerating operation, in addition to the magnetic refrigerating operation caused by the magnetocaloric effect.

The AMR system has been expected to achieve a higher refrigerating efficiency compared to a conventional refrigerating system by a compression cycle using chlorofluorocarbon.

Development of a magnetic refrigerating technique having higher refrigerating efficiency has still been desired from the viewpoint of energy saving.

DETAILED DESCRIPTION

The magnetic refrigerating device according to the embodiment includes a fixed container filled with a refrigerant, the fixed container including a magnetic material container filled with a magnetic material and capable of moving in the fixed container and an elastic member provided at the end of the magnetic material container in the moving direction. The magnetic refrigerating device also includes a magnetic-field applying/removing mechanism that is provided at the outside of the fixed container, and that can apply and remove a magnetic field to and from the magnetic material and can generate a magnetic torque to the magnetic material container in the moving direction.

Embodiments will be described below with reference to the drawings.

First Embodiment

The refrigerating device according to the present embodiment includes: (1) a fixed container filled with a refrigerant, the fixed container including a magnetic material container filled with magnetic material and capable of moving in the fixed container and an elastic member provided at the end of the magnetic material container in the moving direction; and (2) a magnetic field applying/removing mechanism that is provided at the outside of the fixed container for making it possible to apply and remove a magnetic field to and from the magnetic material and to generate a magnetic torque to the magnetic material container in the moving direction.

Since the refrigerating device according to the present embodiment has the configuration described above, a power source, such as a pump, for moving a refrigerant is unnecessary. Therefore, the present invention can provide a magnetic refrigerating device that can enhance refrigerating efficiency. A magnetic refrigerating device that has enhanced refrigerating efficiency can be provided by using the magnetic refrigerating device according to the present embodiment.

Figure 1:
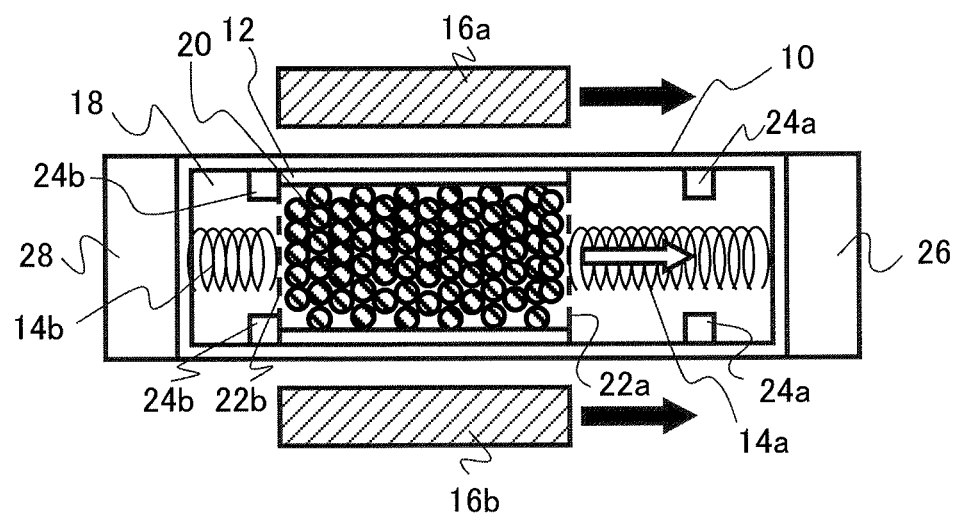
FIG. 1 is a schematic sectional view illustrating a configuration of a main part of a magnetic refrigerating device according to a first embodiment.

FIG. 1 is a schematic sectional view illustrating a configuration of a main part of a magnetic refrigerating device according to the present embodiment. The magnetic refrigerating device includes a fixed container 10, a magnetic material container 12, elastic members 14a and 14b, and permanent magnets 16a and 16b.

The fixed container 10 is a non-magnetic member, and is made of a resin such as plastic. A metal such as aluminum can be used for increasing strength, but from the viewpoint of suppressing generation of eddy current involved in the application and removal of the magnetic field, it is desirable to use resin having high electric resistance.

The fixed container 10 is filled with a refrigerant 18. The refrigerant 18 has a function of transmitting heat generated by a magnetocaloric effect. The refrigerant 18 is, for example, antifreeze solution such as water or ethylene glycol solution.

The magnetic material container 12 is filled with magnetic particles 20 having a magnetocaloric effect. The magnetic particle is, for example, Gd (gadolinium). The magnetic material container 12 is configured to be capable of moving in the fixed container 10. The magnetic material container 12 moves in the fixed container 10 in a direction indicated by a white arrow in FIG. 1. Both ends of the magnetic material container 12 are made of mesh-like partition plates 22a and 22b in order that the refrigerant 18 and the magnetic particles 20 can relatively move, while the magnetic particles 20 are retained in the container.

The magnetic material container 12 is a non-magnetic member, and is made of a resin such as plastic. A metal such as aluminum can be used for increasing strength, but from the viewpoint of suppressing generation of eddy current involved in the application and removal of the magnetic field, it is desirable to use resin having high electric resistance.

The elastic members 14a and 14b are mounted between the end of the magnetic material container 12 in the moving direction and an inner wall of the fixed container 10 in the moving direction. The magnetic material container 12 moves by the restoring force (elastic force) of the elastic members 14a and 14b and magnetic torque of the permanent magnets 16a and 16b. A coil spring is used for the elastic members 14a and 14b, for example.

The permanent magnets 16a and 16b, which are one constituent of the magnetic-field applying/removing mechanism, are provided at the outside of the fixed container 10 so as to sandwich the magnetic material container 12, thereby forming a magnetic circuit. The permanent magnets 16a and 16b can move in the direction indicated by a black arrow in FIG. 1 by a moving mechanism which is not illustrated.

When the permanent magnets 16a and 16b move, the magnetic field can be applied to or removed from the magnetic particles 20. A magnetic torque in the direction same as the moving direction of the permanent magnets 16a and 16b and the magnetic material container 12 can be generated with respect to the magnetic material container 12.

Stoppers 24a and 24b for restricting the movement of the magnetic material container 12 are provided to the fixed container 10. A high-temperature-side heat exchange unit 26 is provided at or connected to one end of the fixed container 10. A low-temperature-side heat exchange unit 28 is provided at or connected to the other end of the fixed container.

The high-temperature-side heat exchange unit 26 and the low-temperature-side heat exchange unit 28 are made of Cu (copper) having high thermal conductivity, for example. Warm heat and cold heat generated to the refrigerant 18 by the magnetic refrigerating cycle are respectively transmitted to the high-temperature-side heat exchange unit 26 and the low-temperature-side heat exchange unit 28. As described later in detail, warm heat and cold heat are further transmitted to an exhaust heat unit and a cooling unit from the high-temperature-side heat exchange unit 26 and the low-temperature-side heat exchange unit 28 in the magnetic refrigerating system using the refrigerating magnetic device according to the present embodiment.

Figure 2:
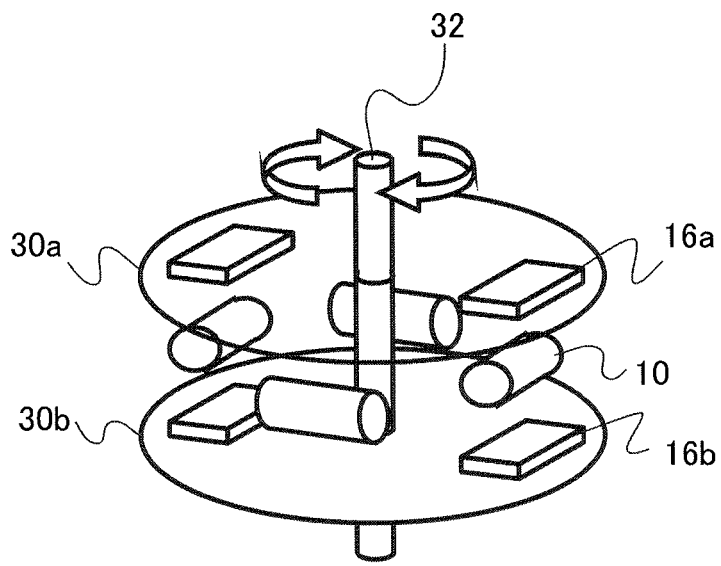
FIG. 2 is a schematic perspective view of the magnetic refrigerating device according to the first embodiment.

FIG. 2 is a schematic perspective view of the magnetic refrigerating device according to the present embodiment. Firstly, four fixed containers 10 illustrated in FIG. 1 are formed on the same circle. Two pairs of permanent magnets 16a and 16b are also provided. Two permanent magnets 16a are fixed on an upper rotating plate 30a, while two permanent magnets 16b are fixed on a lower rotating plate 30b.

The upper rotating plate 30a and the lower rotating plate 30b are fixed to a rotation axis 32 provided at the outside of the fixed container 10, wherein they can synchronously rotate about the rotation axis 32. With this rotation, the permanent magnets 16a and 16b repeat access and separation to and from the fixed container 10. In other words, the permanent magnets 16a and 16b become close to the fixed containers and become away from the fixed containers alternatively. The rotation axis 32 rotates, for example, by a motor, which is not illustrated.

Figure 3A:
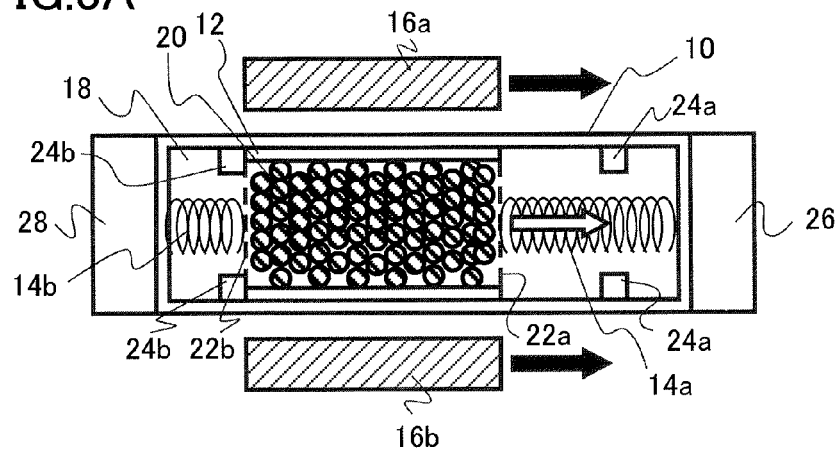
FIGS. 3A, 3B, and 3C are explanatory views of the operation of the magnetic refrigerating device according to the first embodiment.

FIG. 3 is an explanatory view of the operation of the magnetic refrigerating device according to the present embodiment. Firstly, as illustrated in FIG. 3A, the permanent magnets 16a and 16b make an access to the fixed container 10 to reach the position where the permanent magnets 16a and 16b sandwich the magnetic material container 12 due to the rotating movement of the upper rotating plate 30a and the lower rotating plate 30b illustrated in FIG. 2.

In this case, a magnetic torque (magnetic attraction force) is generated between the permanent magnets 16a and 16b and the magnetic material container 12, whereby the magnetic material container 12 moves in the direction indicated by a white arrow in the fixed container 10 by the further movement of the permanent magnets 16a and 16b.

Figure 3B:
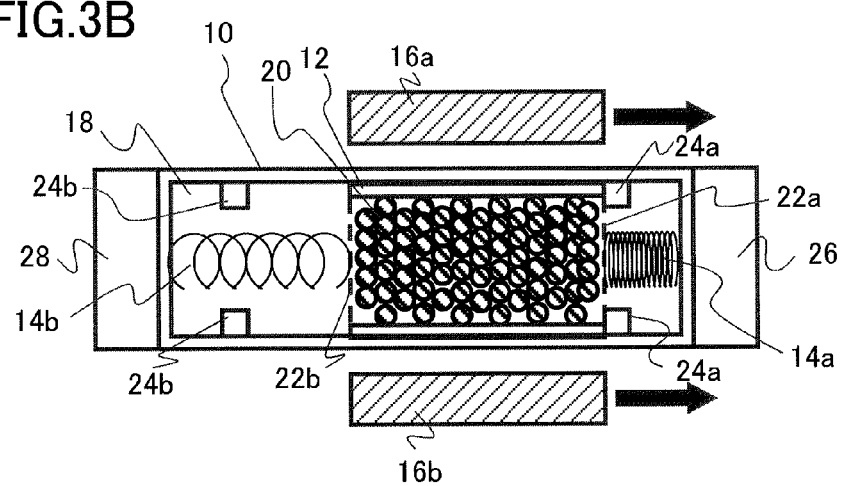

The magnetic material container 12 moving in the fixed container 10 is stopped by the stopper 24a as illustrated in FIG. 3B. In this case, a magnetic field is applied to the magnetic particles 20 by the permanent magnets 16a and 16b, whereby the magnetic particles 20 generate heat. Therefore, the temperature of the refrigerant 18 that is in contact with the magnetic particles 20 increases. The warm heat is transmitted to the high-temperature-side heat exchange unit 26.

Figure 3C:
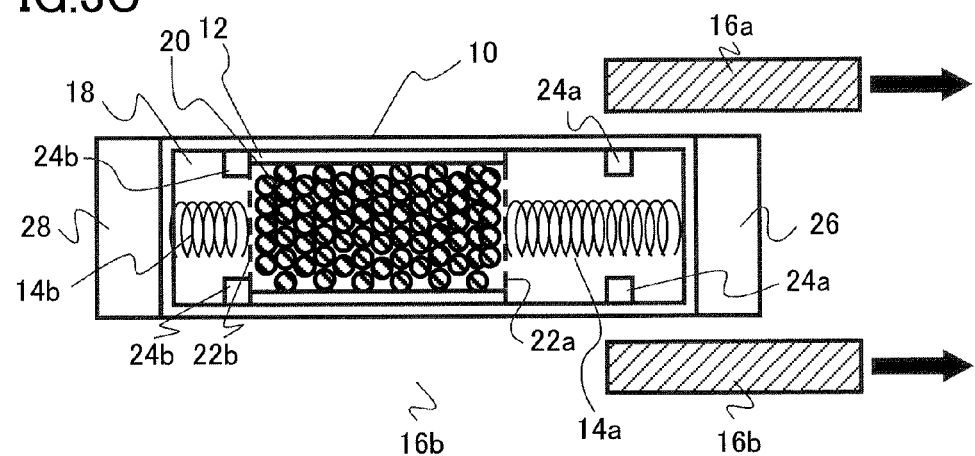

When the permanent magnets 16a and 16b further move in the direction indicated by a black arrow, the magnetic torque (magnetic attraction force) is weakened, so that the magnetic material container 12 moves in the reverse direction due to the restoring force of the elastic members 14a and 14b. As illustrated in FIG. 3C, the magnetic material container 12 is stopped by the stopper 24b. In this case, the magnetic field is not applied to the magnetic particles 20, so that the magnetic particles 20 absorb heat. Accordingly, the temperature of the refrigerant 18 that is in contact with the magnetic particles 20 decreases. The cold heat is transmitted to the low-temperature-side heat exchange unit 28.

The operation in FIGS. 3A to 3C are repeated by the rotating movement of the upper rotating plate 30a and the lower rotating plate 30b, whereby the magnetic refrigeration by the AMR refrigerating cycle is realized.

The elastic member 14a having the elastic force smaller than the magnetic torque generated between the permanent magnets 16a and 16b and the magnetic material container 12 is used. In order to move the magnetic material container 12 in the reverse direction with the restoring force of the elastic member 14a after the removal of the magnetic field, the restoring force of the elastic member 14a is made greater than the sum of the pressure loss generated upon the movement of the magnetic material container 12 in the refrigerant 18 and the elastic force of the elastic member 14b.

The elastic member 14b can be eliminated by optimizing the elastic force of the elastic member 14a. In this case, it is preferable that the elastic force is optimized for minimizing the colliding force between the stopper 24b and the magnetic material container 12. It is desirable that an elastic member made of resin and the like is inserted on the surface of the stopper 24b in order to ease the colliding force between the stopper 24b and the magnetic material container 12, from the viewpoint of enhancing a mechanical reliability.

The elastic members 14a and 14b are preferably made of a non-magnetic material. When they are made of a non-magnetic material, a magnetic torque is not generated during the application and removal of the magnetic field. It is further preferable that they are made of resin. This is because a magnetic loss due to the application and removal of the magnetic field is not generated, and there is no impact given by the eddy current. However, in the case of resin, it is necessary to consider deterioration of the material due to the repeated refrigerating cycle.

The elastic members 14a and 14b are not limited to a coil spring, but other types, such as a leaf spring and silicon rubber, can be used. An optimal material for the elastic member may be selected based on a frequency of the refrigerating cycle, a moving distance of the magnetic material container, an environmental temperature, a type of the refrigerant, and the like.

An O-ring that is in contact with the inner peripheral surface of the fixed container 10 is desirably provided at the outer periphery of the magnetic material container 12. This is because the deterioration in the refrigerating performance caused by the movement of the refrigerant 18 in the gap between the inner surface of the fixed container 10 and the outer surface of the magnetic material container 12 can be prevented.

It is desirable that there is low friction between the outer surface of the magnetic material container 12 and the inner surface of the fixed container 10 in order to facilitate the movement of the magnetic material container 12 and to suppress the generation of friction heat. For example, it is preferable that the respective surfaces are made of Teflon (registered trademark) resin.

Water is the most suitable for the refrigerant 18 because it has the highest specific heat and it is inexpensive. However, in the temperature range of 0 C.° or less, oil refrigerant such as mineral oil or silicon, or solvent refrigerant such as alcohols, e.g. ethylene glycol which is antifreeze solution, can be used. According to an operation temperature range of the refrigerating cycle, the optimal refrigerant can be selected from the above-mentioned oil refrigerant, solvent refrigerant, water, and the mixture solution thereof.

It is desirable that an optimal average particle size of the magnetic particle is selected based on the viscosity (surface tension) of the refrigerant to be used and the size of the fixed container. Enhancing lubricating performance of a heat-transport refrigerant provides an effect of being capable of reducing friction heat involved with the movement between the inner surface of the fixed container and the outer surface of the magnetic material container.

The magnetic material having the magnetocaloric effect in the present embodiment is not particularly limited. It is not limited to the above-mentioned Gd, but a magnetic material exhibiting the magnetocaloric effect, such as Gd compound obtained by adding various elements in Gd (gadolinium), intermetallic compound made of various rare-earth elements and transition metal elements, $Ni_2MnGa$ alloy, GdGeSi compound, $LaFe_{13}$ compound, or $LaFe_{13}H$ compound, can be used. The shape of the magnetic material may be, for example, granular, in the form of plates, or linear.

In the magnetic refrigerating device, absorbing heat or generating heat by the magnetic material causes a great temperature difference via the heat-transport refrigerant, in principle. Therefore, it is necessary to cause heat exchange between the magnetic material and the heat-transport refrigerant. As in the present embodiment, when the magnetic material is an agglomerated powder generated by pressing, or spherical particle formed by various processes for forming particles, such as atomizing method, REP (Rotating Electrode Process), RDP (Rotating Disk Process), the heat-transport refrigerant can be moved in the magnetic material container, when the magnetic material is held by the mesh-like partition plates after the container is filled with the magnetic material. In this case, a filling ratio (Volume of magnetic particles/Inner volume of magnetic material container) can be adjusted by the particle size or the filling method. The volume filling ratio of the magnetic particles to the magnetic material container is desirably 40% or more and 70% or less.

When the volume filling ratio is less than the above-mentioned range, the area required for the heat exchange is decreased, resulting in that the temperature difference greatly decreases. When it is less than the above-mentioned range, the vibration and collision of the magnetic particles due to the flow of the heat-transport refrigerant are generated, whereby fine powders are produced. Therefore, a pressure loss caused by clogging is liable to be generated. When it exceeds the above-mentioned range, the pressure loss increases, and the movement of the heat-transport refrigerant is restricted. Accordingly, the temperature difference decreases. The volume filling ratio is desirably 50% or more and 65% or less, and more desirably 55% or more and 60% or less.

The particle size of the magnetic material is a factor of determining the volume filling ratio, and it is desirable that the particles are substantially spherical having an average particle diameter of 100 μmΦ or more and 2000 μmΦ or less. The average particle diameter of the magnetic particle can be visually measured by a slide gauge and a like, or can be measured through a direct observation by a microscope or by a microgram.

A substantially spherical shape is suitable for reducing the pressure loss and increasing a surface area in order to enhance heat exchange efficiency. When the average particle diameter is smaller than the above-mentioned range, the pressure loss remarkably increases to hinder the movement of the heat-transport refrigerant, with the result that the refrigerating efficiency of the magnetic refrigerating device deteriorates. When the diameter exceeds the above-mentioned range, the surface area decreases, whereby remarkably reducing the heat exchange efficiency.

From the viewpoint of reducing the pressure loss to enhance the heat exchange efficiency, it is desirable that an aspect ratio of the magnetic particles of 80 wt % is 2 or less, and the particle diameter (major diameter) of the magnetic particle is 100 μmΦ or more and 2000 μmΦ or less. From the viewpoint of further increasing the temperature difference, it is desirable that the average particle diameter is 200 μmΦ or more and 800 μmΦ or less.

When the spherical particles fill the magnetic material container, a temperature gradient corresponding to the temperature difference generated by the refrigerating cycle is caused in the magnetic material container. It is preferable that a multi-layer structure in which magnetic materials, each having different Curie temperature (magnetic transition temperature), are arranged in a layered form, is formed according to the temperature gradient. It is preferable that a mesh-like partition plate is provided between layers, in the case of the spherical particles.

In the present embodiment, two pairs of permanent magnets are provided to the rotating plate. However, not limited to two pairs, one pair or three or more pairs may be provided. However, it is desirable that plural pairs are provided from the viewpoint of stabilizing the rotation of the rotating plate. Single magnet or an odd number of magnets may also be applicable.

In the present embodiment, four fixed containers are arranged on the same circle. However, not limited to four containers, one to three, or five or more containers may be arranged.

Next, the magnetic refrigerating system according to the present embodiment will be described. The magnetic refrigerating system according to the present embodiment includes the magnetic refrigerating device explained with reference to FIGS. 1 to 3, an exhaust heat unit thermally connected to the high-temperature-side heat exchange unit of the magnetic refrigerating device, and a cooling unit thermally connected to the low-temperature-side heat exchange unit.

Figure 4:
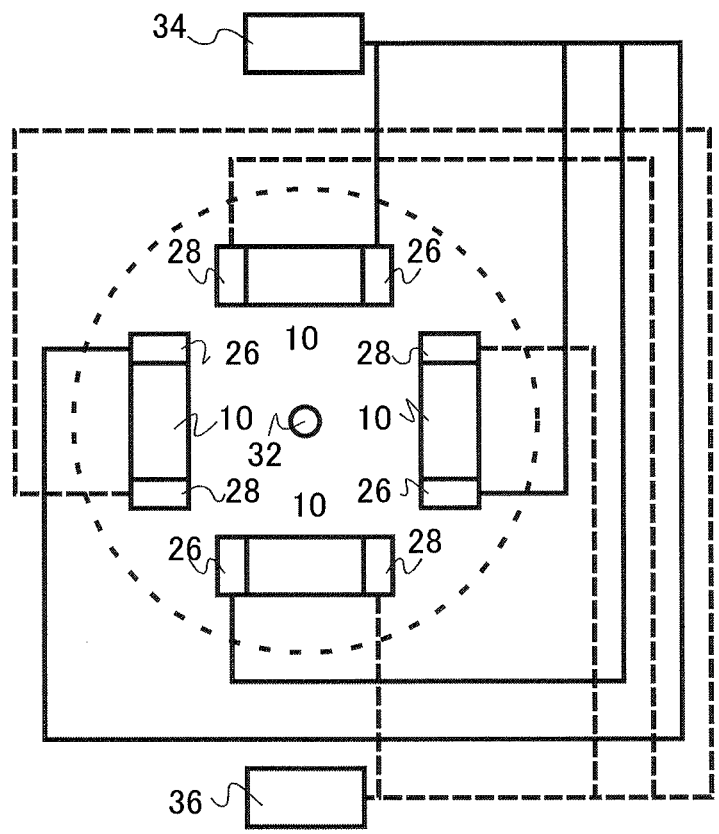
FIG. 4 is a schematic plan view illustrating the configuration of a magnetic refrigerating system according to the first embodiment.

FIG. 4 is a schematic plan view illustrating the configuration of the magnetic refrigerating system according to the present embodiment. Four fixed containers 10 are arranged on the same circle having the rotation axis 32 of the upper and lower rotating plates as a center.

The high-temperature-side heat exchange unit 26 of each of the fixed containers 10 is thermally connected to the exhaust heat unit 34 in parallel. The low-temperature-side heat exchange unit 28 of each of the fixed containers 10 is thermally connected to the cooling unit 36 in parallel.

The warm heat generated by the high-temperature-side heat exchange unit 26 due to the magnetic refrigerating cycle is transmitted to the exhaust heat unit 34 through a heat exchanger, for example. On the other hand, cold heat generated by the low-temperature-side heat exchange unit 28 due to the magnetic refrigerating cycle is transmitted to the cooling unit 36 via the heat exchanger, for example.

The transmission of the warm heat and cold heat to the exhaust heat unit 34 and the cooling unit 36, indicated by a solid line and a chain line in the figure, can be realized by utilizing a known heat exchange gas, liquid, or solid heat conduction.

The magnetic refrigerating system according to the present embodiment is, for example, a home air-conditioner. In this case, the exhaust heat unit 34 is a radiator plate, and the cooling unit 36 is a room to be cooled.

In the magnetic refrigerating system according to the present embodiment, the fixed containers are thermally connected in parallel. Therefore, a great temperature difference is not expected, but it is suitable for cooling or warming a subject having relatively large thermal capacity.

As described above, the magnetic refrigerating device and the magnetic refrigerating system according to the present embodiment relatively move the magnetic material with respect to the refrigerant in the fixed container by the movement of the permanent magnets and the elastic force of the elastic member. Accordingly, a power source for moving the refrigerant is unnecessary, whereby realizing magnetic refrigeration having high refrigerating efficiency.

Second Embodiment

A magnetic refrigerating device and a magnetic refrigerating system according to a second embodiment is the same as those in the first embodiment, except that a magnetic member is provided at the end of the magnetic material container. Therefore, description of the contents overlapped with those of the first embodiment will not be repeated.

Figure 5:
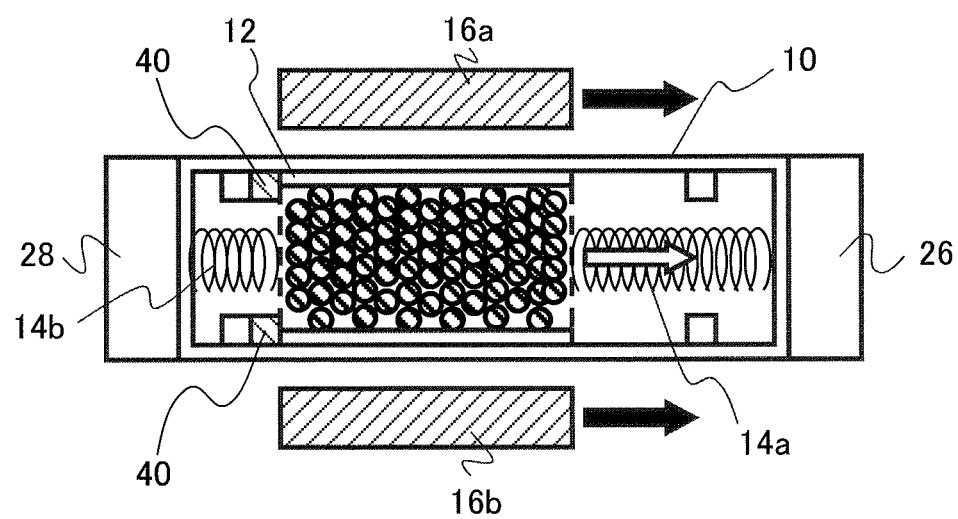
FIG. 5 is a schematic sectional view illustrating a configuration of a main part of a magnetic refrigerating device according to a second embodiment.

FIG. 5 is a schematic sectional view illustrating a configuration of a main part of the magnetic refrigerating device according to the second embodiment. The magnetic refrigerating device includes a magnetic member 40 at the end of a magnetic material container 12 in addition to the components of the magnetic refrigerating device in FIG. 1.

The magnetic member 40 is a member for determining a moving timing of the magnetic material container 12 with respect to the change in the magnetic torque (magnetic attraction force) generated by an application and removal of the magnetic field. A ferromagnetic body is used for the magnetic member 40. Since the magnetic member 40 is provided, an auxiliary magnetic torque is generated to the magnetic material container 12, whereby the magnetic material container is adjusted to be moved to an optimal position at an optimal time. Accordingly, the refrigerating efficiency can be further enhanced.

It is preferable that not only a general ferroelectric body such as iron but also a hard magnetic material (magnet material) or soft magnetic material (e.g. ferrite, amorphous material, permalloy, sendust, dust core, and silicon steel plate) is used for the ferromagnetic body. In particular, the soft magnetic material exhibits an effect to the generation of eddy current and iron loss (hysteresis loss) when the magnetic field generated by the magnetic refrigerating cycle is applied or removed.

Specifically, when the magnetic refrigerating cycle has a high frequency, a great Joule heat is generated due to the loss. Therefore, the low heat at the low-temperature end of the magnetic material container is heated, whereby deteriorating the refrigerating performance. In order to reduce the Joule heat, resistance of the magnetic member has to be increased to have a low coercive force and low iron loss.

On the other hand, when the warm heat at the high-temperature end of the magnetic material container is utilized as a heating apparatus, the Joule heat can positively be used. Specifically, when a material having low resistance and high loss is used for the magnetic member, the generated Joule heat is added to the high heat, whereby further raising the temperature.

The magnetic member 40 may be provided at both ends of the magnetic material container. Such arrangement is particularly effective in the reciprocating movement in which the relative moving direction, wherein the fixed container and the permanent magnets are made close to each other or are separated from each other, is alternately changed. In this case, it is necessary that each of the magnetic members 40 at both ends of the magnetic material container has a different shape or is made of a different material in order to adjust the moving timing. Further, the magnetic member is a permanent magnet, wherein attraction force or repulsion force with respect to the magnetic attraction force for allowing the fixed container and the permanent magnets to be close to each other or separated from each other may be used for the adjustment of the moving timing.

Third Embodiment

In a magnetic refrigerating device and a magnetic refrigerating system according to a third embodiment, plural fixed containers are annularly arranged in series, wherein a high-temperature-side heat exchange unit is provided at or connected to a first fixed container at one terminal of the annularly arranged fixed containers, and a low-temperature-side heat exchange unit is provided at or connected to a second fixed container at the other terminal of the annularly arranged fixed containers. In such configuration, a magnetic transition temperature of a magnetic material in the fixed container at one terminal end is higher than the magnetic transition temperature of a magnetic material in the fixed container at the other terminal. The configuration other than the above-mentioned configuration is the same as that in the first embodiment. Therefore, description of the contents overlapped with those of the first embodiment will not be repeated.

Figure 6:
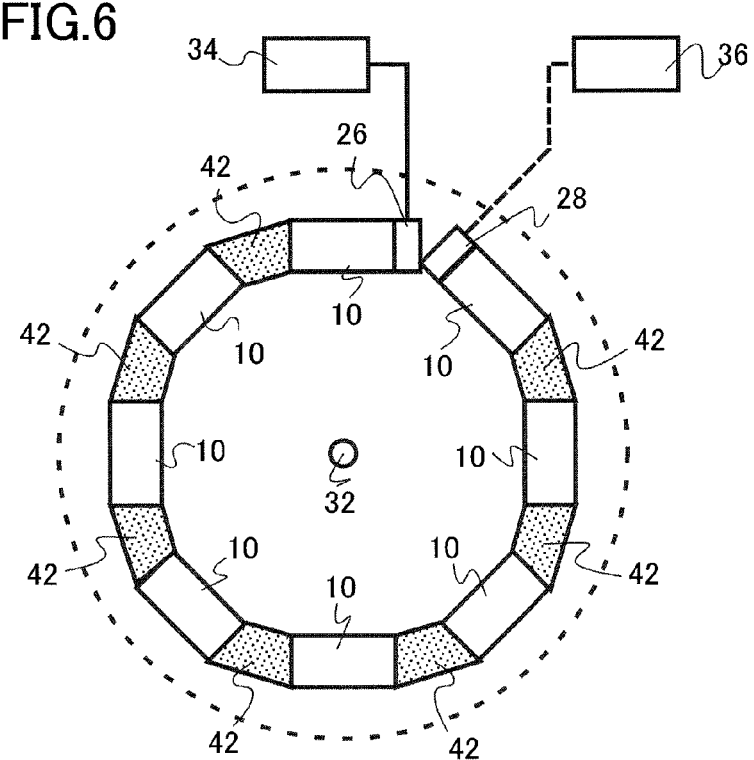
FIG. 6 is a schematic plan view illustrating a configuration of a magnetic refrigerating system according to a third embodiment.

FIG. 6 is a schematic plan view illustrating a configuration of the magnetic refrigerating system according to the present embodiment. Eight fixed containers 10 are annularly arranged in series on the same circle having a rotation axis 32 of the rotating plate as a center. The series means here that the fixed containers are thermally arranged in series.

The ends of the adjacent fixed containers 10 are connected by a connection pipe 42. A refrigerant 18 in the fixed container 10 communicates with the refrigerant 18 in the adjacent fixed container 10 with the connection pipe 42.

A high-temperature-side heat exchange unit 26 is provided at one terminal of the fixed container 10, located at a terminal, of the eight fixed containers. A low-temperature-side heat exchange unit 28 is provided at the terminal of the fixed container 10 located at the other terminal.

The magnetic transition temperature of a magnetic material in the fixed container 10, provided with the high-temperature-side heat exchange unit 26, at the terminal is higher than the magnetic transition temperature of the magnetic material in the magnetic refrigerating device, provided with the low-temperature-side heat exchange unit 28, at the other terminal. It is configured, for example, that the magnetic transition temperature of the magnetic material is gradually decreased from the fixed container 10, provided with the high-temperature-side heat exchange unit 26, at the terminal toward the adjacent fixed container 10, resulting in that the magnetic material of the magnetic refrigerating device, provided with the low-temperature-side heat exchange unit 28, at the other terminal has the lowest magnetic transition temperature.

In the magnetic refrigerating system according to the present embodiment, the high-temperature-side heat exchange unit 26 having the above-mentioned configuration is thermally connected to a exhaust heat unit 34. The low-temperature-side heat exchange unit 28 is thermally connected to the cooling unit 36.

The present embodiment can realize a high magnetic refrigerating temperature difference, since the fixed containers, each are filled with a magnetic material having a different magnetic transition temperature, are connected in series. Accordingly, the magnetic refrigerating device and the magnetic refrigerating system according to the present embodiment are well applicable to a system requiring a high refrigerant temperature difference, such as a freezer.

Fourth Embodiment

A magnetic refrigerating device and a magnetic refrigerating system according to a fourth embodiment are the same as those in the third embodiment, except that the ends of the adjacent fixed container are connected with a solid member, not with the connection pipe. Therefore, description of the contents overlapped with those of the third embodiment will not be repeated.

Figure 7:
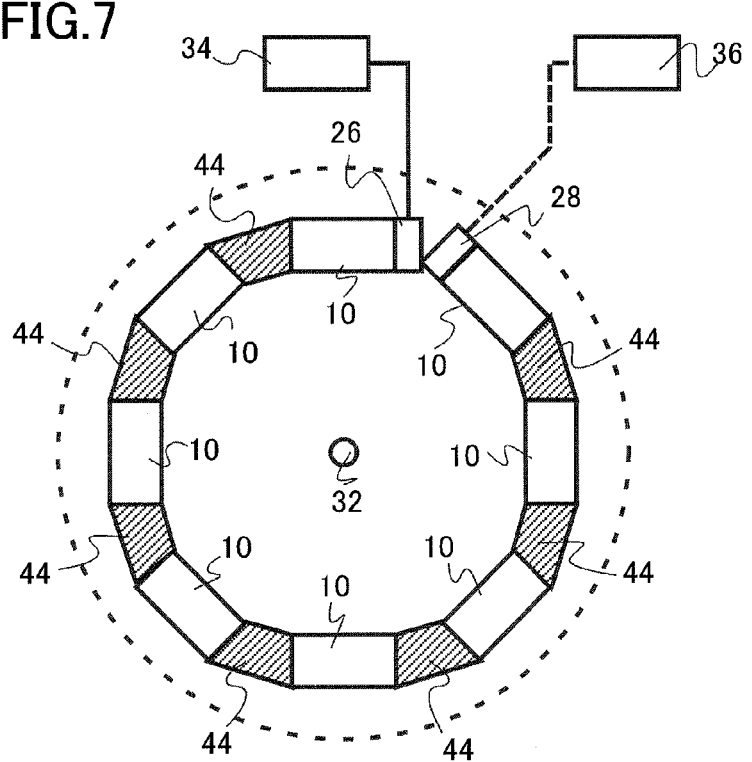
FIG. 7 is a schematic plan view illustrating a configuration of a magnetic refrigerating system according to a fourth embodiment.

FIG. 7 is a schematic plan view illustrating a configuration of the magnetic refrigerating system according to the present embodiment. Like the third embodiment, eight fixed containers 10 are annularly arranged in series on the same circle having a rotation axis 32 of the rotating plate as a center. The series means here that the fixed containers are thermally arranged in series.

The ends of the adjacent fixed containers 10 are connected with a solid member 44. Thermal conductivity between the adjacent fixed containers 10 is secured through the solid member 44.

A metallic material, e.g., Cu (copper), having high thermal conductivity can be applied to the solid member 44.

In the magnetic refrigerating device and the magnetic refrigerating system according to the present embodiment, the refrigerant 18 does not come and go between the respective fixed containers 10, so that the independency of the fixed container 10 is high. Accordingly, an effect of providing high maintenance property of the device and the system can be provided, in addition to the effect of the third embodiment.

Fifth Embodiment

In a magnetic refrigerating device and a magnetic refrigerating system according to a fifth embodiment, a magnetic material container in a fixed container moves by magnetic torque generated by an electromagnet, not by movement of permanent magnets. Description of the contents overlapped with those of the first to fourth embodiments will not be repeated.

Figure 8:
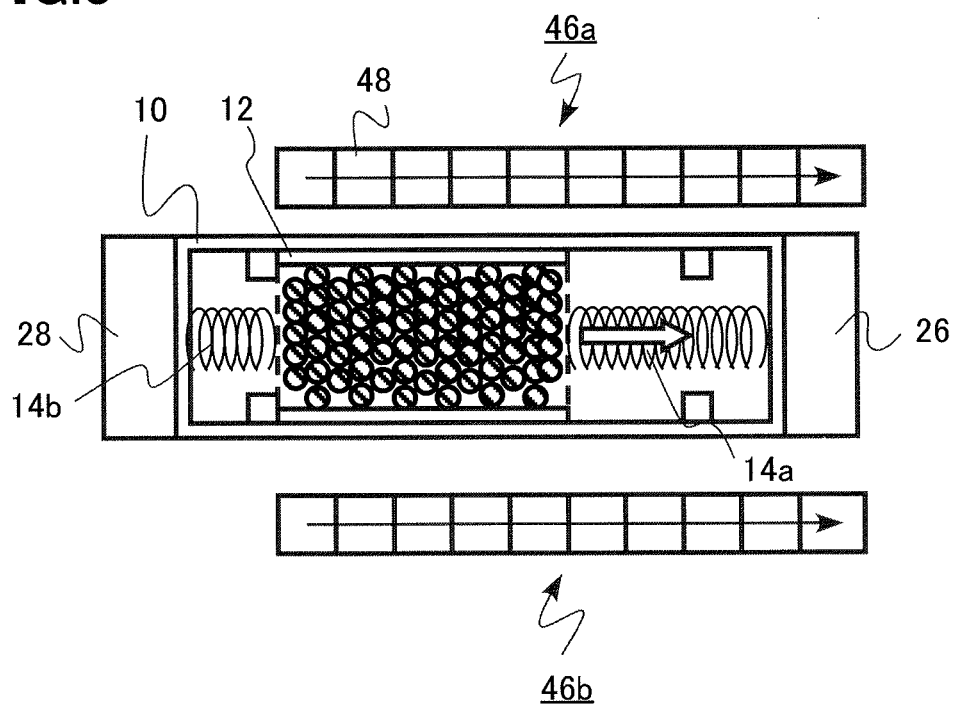
FIG. 8 is a schematic sectional view illustrating a configuration of a main part of a magnetic refrigerating device according to a fifth embodiment.

FIG. 8 is a schematic sectional view illustrating a configuration of a main part of the magnetic refrigerating device according to the present embodiment. The magnetic refrigerating device according to the present embodiment includes electromagnets 46a and 46b as one component of a magnetic-field applying/removing mechanism. The electromagnets 46a and 46b are divided into plural small blocks 48 that can independently control the application and removal of the magnetic field.

In the operation of the magnetic refrigerating device according to the present embodiment, turning on/off of each of the small blocks 48 of the electromagnets 46a and 46b is sequentially changed in the direction indicated by a black arrow in FIG. 8, whereby adjusting the magnetic torque to the magnetic material container 12. Therefore, the operation same as the operation of moving the permanent magnets as in the first embodiment can be obtained. Accordingly, the magnetic refrigerating cycle of an AMR system can be realized.

According to the present embodiment, a physical movement of the magnet is unnecessary, so that the configuration of the magnetic refrigerating device can be simplified. Consequently, the device can easily be downsized.

Sixth Embodiment

A magnetic refrigerating device and a magnetic refrigerating system according to a sixth embodiment are the same as those in the first embodiment, except that plate-like magnetic materials are used as magnetic material. Therefore, description of the contents overlapped with those of the first embodiment will not be repeated.

Figure 9:
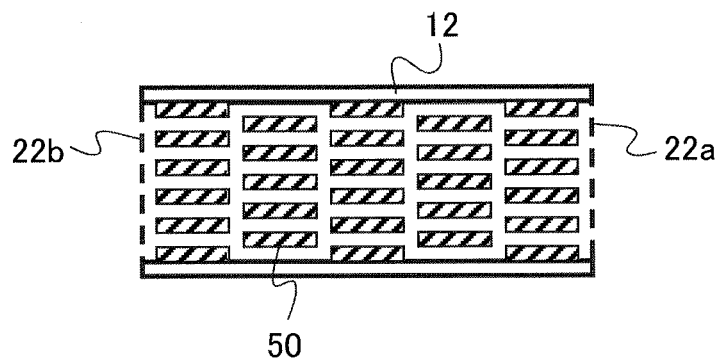
FIG. 9 is a schematic sectional view illustrating a configuration of a magnetic material container according to a sixth embodiment.

FIG. 9 is a schematic sectional view illustrating a configuration of the magnetic material container according to the present embodiment. The magnetic material container 12 is filled with plate-like magnetic materials 50. FIG. 9 illustrates a section vertical to the widest surface of the plate-like magnetic material 50. In the present embodiment, it is desirable that the magnetic field is applied in the direction parallel to the widest surface of the plate-like magnetic material, i.e., in the direction perpendicular to the sheet surface, from the viewpoint of reducing the loss by the eddy current.

According to the present embodiment, the pressure loss generated between a refrigerant and the magnetic material is reduced, compared to magnetic particles. When the laminate structure of the plate-like magnetic material is divided as illustrated in FIG. 9, heat transport in the magnetic material by thermal conductivity can be prevented.

When the plate-like magnetic materials 50 are alternately laminated as illustrated in FIG. 9, turbulent flow can be generated in the flow of the refrigerant. Therefore, an apparent contact area contributing to the heat exchange between the refrigerant and the plate-like magnetic material 50 increases. Accordingly, the refrigerating efficiency is enhanced.

While certain embodiments have been described, these embodiments have been presented by way of example only, and are not intended to limit the scope of the inventions. Indeed, the refrigerating device and the refrigerating system described herein may be embodied in a variety of other forms; furthermore, various omissions, substitutions, and changes in the form of the devices and methods described herein may be made without departing from the spirit of the inventions. The accompanying claims and their equivalents are intended to cover such forms or modifications as would fall within the scope and spirit of the inventions.

For example, the magnetic material in the form of a particle and in the form of a plate has been described herein. However, the magnetic material may have a cylindrical shape or linear shape. In the case of the linear shape, the magnetic materials may be formed into a mesh-like shape, and may be laminated in the direction of flow of the refrigerant (in the direction in which the magnetic material container moves), and the material with this state may fill the magnetic material container.

In the above description, the permanent magnets make a rotating motion in the magnetic-field applying/removing mechanism. However, the permanent magnets may reciprocate with respect to the fixed container. In this case, it is preferable that a linear drive actuator or a cam mechanism for converting the rotating motion to a linear motion is used. The relative movement of the permanent magnets and the fixed container can manually be made, or by using driving force of a vehicle as being branched, or by directly using natural energy such as force of wind, wave power, and water power.

Example

An example of the present invention will be described below. A magnetic refrigerating device similar to that in the second embodiment was used to evaluate the refrigerating performance.

A cylindrical magnetic material container made of resin was filled with Gd spheres, each having about 0.5 mmΦ. A metallic mesh was provided and fixed at both ends of the magnetic material container in order that the refrigerant flew without allowing the Gd spheres to go out. An O-ring was fixed to the outer periphery of the magnetic material container. An iron ring, serving as a magnetic member, was fixed to the end of the magnetic material container at the position slightly apart from the Gd spheres filling section.

The magnetic material container was inserted into the cylindrical fixed container made of resin, and it was confirmed that the magnetic material container smoothly moved. The O-ring at the outer periphery of the magnetic material container restricts the movement of the refrigerant flowing in the gap between the fixed container and the magnetic material container. In order to reduce the friction resistance between the fixed container and the magnetic material container, Teflon (registered trademark) resin having a small friction coefficient was used and fixed to a friction generating section.

A coil spring was inserted to both ends of the magnetic material container, wherein the coil spring was fixed in a preliminary compression state (in a state in which the spring is slightly compressed) from both ends of the fixed container. With this structure, a watertight structure is attained with the O-ring filled with the antifreeze solution serving as the refrigerant.

As one example of a magnetic-field generating unit, a magnetic circuit in which a magnet is fixed by an iron yoke so as to be opposite to each other with a gap is connected to a motor in order that the magnetic circuit rotates. With the rotation of the motor, the magnetic field is turned on when the relative positions of the magnetic material container and the magnet agree with each other, and it is turned off when they are separated from each other.

A magnetic torque (attraction force) is generated to the magnetic field in the gap and the magnetic material container. When the force for pulling the magnetic material container from the magnetic field in the gap is defined as an escape torque, a spring load generated by the amount of deflection of the spring is set to be smaller than the escape torque. This is because, when the spring load is set to be greater than the escape torque, the movement of the magnetic material container is hindered.

The magnetic circuit opposes to the magnetic material container to generate the magnetic torque, whereby the magnetic material container is drawn in the direction in which the magnetic circuit moves in the refrigerant to reach the position at the high-temperature end. When the magnetic material container is further drawn, by which the magnetic torque is eliminated, the magnetic material container is pushed back by the spring to move to the low-temperature end. In this case, the iron ring, which is fixed at the end of the magnetic material container and serves as the magnetic member, generates the auxiliary magnetic torque when the magnetic material container is drawn by the magnetic circuit, whereby adjusting the timing (time and position) when the magnetic material container is pushed back by the spring. The material and volume are set based on the necessary magnetic torque.

Turning on/off of the magnetic field by the movement of the magnetic circuit and the movement of the magnetic material container were adjusted, and the motor that was stopped was driven to continuously rotate with the revolution of 90 rpm. With this state, the temperature change with time was evaluated. The temperature was measured in such a manner that a thermocouple was inserted to both ends of the magnetic material container so as to measure the temperature in the vicinity of the high-temperature end and the low-temperature end.

Figure 10:
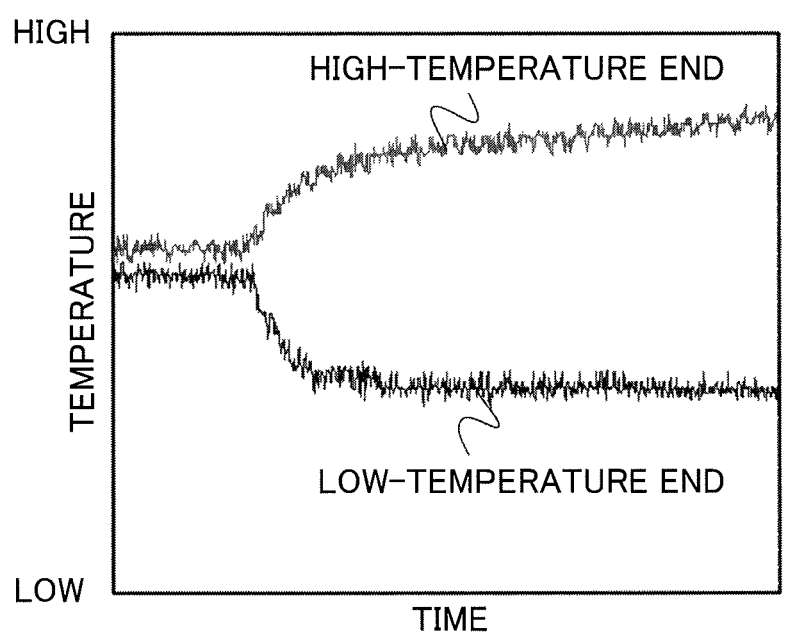
FIG. 10 is a view illustrating a measurement result of an example.

FIG. 10 is a view illustrating the measurement result. The temperatures at the high-temperature end and at the low-temperature end are constant when the motor is stopped. When the motor is driven, the operation of the AMR refrigerating cycle is repeated. Since the deviation between both of them is caused by the variation in the output of the thermocouple, there is no substantial problem. With this, the temperature at the high-temperature end increases from the temperature with the motor being stopped. On the other hand, the temperature at the low-temperature end decreases. Accordingly, it is confirmed that the temperature at the low-temperature end can be used for the cold heat, while the high-temperature end can be utilized as an exhaust heat to air or a heater.

What is claimed is:

1. A magnetic refrigerating device comprising:
   a fixed container filled with a refrigerant, the fixed container including a magnetic material container filled with a magnetic material and being capable of moving in the fixed container and an elastic member provided at an end of the magnetic material container; and
   a permanent magnet provided at outside of the fixed container, the permanent magnet configured to move in a moving direction of the magnetic material container, the permanent magnet configured to apply and remove a magnetic field to and from the magnetic material and to generate a magnetic torque in the moving direction of the magnetic material container,
   wherein the magnetic material is filled in the magnetic material container so that the refrigerant and the magnetic material relatively move with a movement of the magnetic material container.

2. The device according to claim 1, wherein the elastic member is a coil spring.

3. The device according to claim 1, wherein the permanent magnet rotates about a rotation axis provided at the outside of the fixed container so that the permanent magnet becomes close to the fixed container and becomes away from the fixed container alternatively.

4. The device according to claim 1, wherein the fixed container and the magnetic material container are made of a non-magnetic material.

5. The device according to claim 1, further comprising:
- a high-temperature-side heat exchange unit connected to one end of the fixed container; and
- a low-temperature-side heat exchange unit connected to the other end of the fixed container.

6. The device according to claim 1, wherein both ends of the magnetic material container are made of mesh-like partition plates.

7. A magnetic refrigerating device comprising:
- a fixed container filled with a refrigerant, the fixed container including a magnetic material container filled with a magnetic material capable of moving in the fixed container and an elastic member provided at an end of the magnetic material container; and
- a permanent magnet provided at outside of the fixed container, the permanent magnet configured to move in a moving direction of the magnetic material container, the permanent magnet configured to apply and remove a magnetic field to and from the magnetic material and to generate a magnetic torque in the moving direction of the magnetic material container, wherein
the magnetic material is filled in the magnetic material container so that the refrigerant and the magnetic material relatively move with a movement of the magnetic material container, wherein
a magnetic member is provided at an end of the magnetic material container.

8. A magnetic refrigerating device comprising:
- a fixed container filled with a refrigerant, the fixed container including a magnetic material container filled with a magnetic material capable of moving in the fixed container and an elastic member provided at an end of the magnetic material container; and
- an electromagnet provided at outside of the fixed container, the electromagnet configured to apply and remove a magnetic field to and from the magnetic material and to generate a magnetic torque in a moving direction of the magnetic material container, wherein the magnetic material is filled in the magnetic material container so that the refrigerant and the magnetic material relatively move with a movement of the magnetic material container.

9. The device according to claim 8, wherein both ends of the magnetic material container are made of mesh-like partition plates.

10. A magnetic refrigerating device comprising:
- a fixed container filled with a refrigerant, the fixed container including a magnetic material container filled with a magnetic material capable of moving in the fixed container and an elastic member provided at an end of the magnetic material container; and
- an electromagnet provided at outside of the fixed container, the electromagnet configured to apply and remove a magnetic field to and from the magnetic material and to generate a magnetic torque in a moving direction of the magnetic material container, wherein the magnetic material is filled in the magnetic material container so that the refrigerant and the magnetic material relatively move with a movement of the magnetic material container, wherein a magnetic member is provided at an end of the magnetic material container.

\* \* \* \* \*